United States Patent [19]
Takuma et al.

[11] Patent Number: 5,672,462
[45] Date of Patent: Sep. 30, 1997

[54] OPTICAL RECORDING MEDIUM

[75] Inventors: Keisuke Takuma; Tsutami Misawa; Kenichi Sugimoto, all of Yokohama; Taizo Nishimoto, Kamakura; Takeshi Tsuda; Hideki Umehara, both of Yokohama, all of Japan

[73] Assignee: Mitsui Toatsu Chemicals, Inc., Tokyo, Japan

[21] Appl. No.: 661,071

[22] Filed: Jun. 10, 1996

[30] Foreign Application Priority Data

Jun. 16, 1995 [JP] Japan ................................ 7-150157

[51] Int. Cl.$^6$ ........................................ G11B 7/00
[52] U.S. Cl. ............... 430/270.15; 430/945; 430/270.2; 430/270.16; 369/284; 369/288
[58] Field of Search .................... 546/154, 172; 430/945, 270.15, 270.2, 270.16; 369/283, 284, 286, 288

[56] References Cited

U.S. PATENT DOCUMENTS

| | | | |
|---|---|---|---|
| 4,412,231 | 10/1983 | Namba et al. | 430/945 |
| 4,415,650 | 11/1983 | Kido et al. | 430/945 |
| 4,860,273 | 8/1989 | Sawano et al. | 369/100 |
| 5,079,061 | 1/1992 | Hashida et al. | 430/945 |
| 5,359,075 | 10/1994 | Ohyama et al. | 546/154 |
| 5,395,678 | 3/1995 | Matsushima et al. | 430/7 |
| 5,512,416 | 4/1996 | Namba et al. | 430/270.21 |
| 5,532,033 | 7/1996 | Yashiro | 430/945 |
| 5,569,504 | 10/1996 | Kitagawa et al. | 430/945 |

FOREIGN PATENT DOCUMENTS

| | | | |
|---|---|---|---|
| 0340968 | 11/1989 | European Pat. Off. | |
| 53-129223 | 11/1978 | Japan | 546/154 |
| 2-278519 | 11/1990 | Japan | |
| 6-9891 | 1/1994 | Japan | 546/154 |
| 6-40162 | 2/1994 | Japan | |
| 6-220339 | 8/1994 | Japan | 546/154 |

OTHER PUBLICATIONS

Database WPI, Week 9407, Derwent Publications, Ltd., London, GB; AN 94–054054, XP002015035 & JP-A-06009891 (abstract).

Nikkei Electronics, No. 465, p. 107 (Jan. 23, 1989) [together with English abstract].

Nikkei Electronics, No. 552, p. 90 (Apr. 27, 1992) [together with English abstract].

Nikkei Electronics, No. 589, p. 55 (Aug. 30, 1993) [together with English abstract].

Nikkei Electronics, No. 592, p. 65 (Oct. 11, 1993) [together with English abstract].

Nikkei Electronics, No. 594, pp. 169–170 (Nov. 8, 1993) [together with English abstract].

Appl. Phys. Lett., "Blue-green Laser Diodes", vol. 59, (11), Sep. 9, 1991.

Colour Index, Third Ed., vol. 4. pp. 4435–4436 (1972).

*Primary Examiner*—Martin Angebranndt
*Attorney, Agent, or Firm*—Burns, Doane, Swecker & Mathis

[57] ABSTRACT

The present invention relates to an optical recording medium having a recording layer, a reflective layer and a protective layer on a substrate, wherein a quinophthalone compound represented by the following formula (1) is contained in the above recording layer. The use of the quinophthalone compound or a mixture of the quinophthalone compound and a photoabsorbing compound having an absorption maximum in a wavelength falling in a range of 550 to 900 nm in the recording layer makes it possible to provide an interchangeable optical recording medium not only capable of recording and reproducing with a laser having a wavelength falling in a range of 480 to 600 nm, but is also capable of recording and reproducing with red lasers having wavelengths of 630 nm and 680 nm and a near infrared laser having a wavelength of 780 nm.

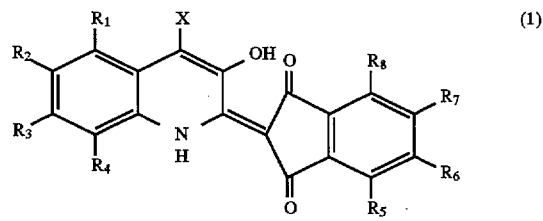

(1)

8 Claims, 1 Drawing Sheet

OPTICAL RECORDING MEDIUM

BACKGROUND OF THE INVENTION

(1) Field of the Invention

The present invention relates to an optical recording medium, specifically to an optical recording medium which is usable for lasers of various wavelengths. The optical recording medium is capable of recording and reproducing with a laser having a wavelength falling in a range of 480 to 600 nm and further capable of reproducing or recording and reproducing as well with a laser having a wavelength falling in a range of 600 to 830 nm.

(2) Description of the Related Art

A compact disk (hereinafter abbreviated as CD) which meets CD standards and is capable of writing or recording is proposed as an optical recording medium having a reflective layer on a substrate (for example, Nikkei Electronics, No. 465, p. 107, Jan. 23, 1989 issue). As shown in FIG. 1, this optical recording medium comprises a recording layer 2, a reflective layer 3, and a protective layer 4 formed on a substrate 1 in this order. When a laser beam such as a semiconductor laser is irradiated at a high power to the recording layer in this optical recording medium, the recording layer changes physically or chemically so that information is recorded thereon in the form of pits. The pits thus formed are irradiated with a laser beam of a low power, and a reflected beam is detected, whereby the information recorded in the pits can be reproduced. In general, such optical recording medium uses a near infrared semiconductor laser having a wavelength falling in a range of 770 to 830 nm for recording and reproducing and is therefore characterized by that it is usable for CD players and CD-ROM players since it satisfies CD standards such as a red book and an orange book.

In recent years, the development of a semiconductor laser having a wavelength shorter than 770 nm has been advanced, and red semiconductor lasers having wavelengths of 680 nm and 635 nm have been put into practical use (for example, Nikkei Electronics, No. 592, p. 65, Oct. 11, 1993). Further, a laser of 532 nm obtained by higher harmonic conversion of a YAG laser has been put into practical use. A beam spot gets smaller by shortening a wavelength of a laser for recording and reproducing, so that high density recording is possible in an optical recording medium. Thus, large capacity optical recording media capable of memorizing moving pictures by shortening a wavelength of a laser and using a data compression technique have been developed (for example, Nikkei Electronics, No. 589, p. 55, Aug. 30, 1993). Such high density optical recording medium can record data of such large volume as moving pictures and is expected to be applied to uses such as video CD (for example, Nikkei Electronics, No. 594, p. 169, Nov. 8, 1993). Proposed in Japanese Patent Laid-Open No. 2-278519 is high sensitivity and high speed recording made by a method in which recording is made at a high sensitivity with a short wavelength laser of 680 nm and reproducing is made with a laser of 780 nm.

On the other hand, an optical recording medium capable of recording and reproducing with a short wavelength laser is proposed in Japanese Patent Laid-Open No. 6-40162. This medium uses an indocarbocyanine dye for a recording layer and can record with a semiconductor laser of 635 nm and a He.Ne laser.

A blue/green semiconductor laser having a wavelength of 490 nm which is shorter than 532 nm has been studied, and it is said that the above laser is close to a stage of practical use (for example, Applied Physics Letter, p. 1272 to 1274, Vol. 59 (1991) and Nikkei Electronics, No. 552, p. 90, Apr. 27, 1992).

Such circumstances as described above tend to shorten the wavelength for recording and reproducing in an optical recording medium to about 500 nm or less. Accordingly, optical recording media meeting such tendency are required to be developed, and further an interchangeable optical media to be usable for conventional 780 nm are desired. However, it has been impossible for conventional optical recording media to reproduce with a laser of 532 nm.

SUMMARY OF THE INVENTION

An object of the present invention is to provide an Optical recording medium capable of recording and reproducing with a laser having a wavelength falling in a range of 480 to 600 nm and further capable of reproducing, or recording and reproducing with a near infrared laser (commercially available CD players and the like) having wavelengths of 635 and/or 680 nm and/or 780 nm.

Intensive investigations made by the present inventors in order to solve the problems described above have resulted in completing the present invention. That is, the present invention relates to:

(1) an optical recording medium comprising, a recording layer, a reflective layer and a protective layer provided on a substrate, wherein the recording layer contains a quinophthalone compound represented by the following Formula (1) and having an absorption maximum in a wavelength falling in a range of 400 to 500 nm:

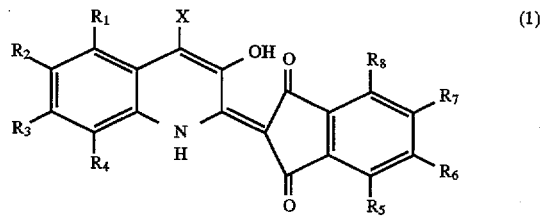

wherein $R_1$ to $R_8$ are independently a hydrogen atom, a halogen atom, a nitro group, an alkyl group, an alkoxyalkyl group, an alkoxyl group, an alkoxyalkoxyl group, an aryloxy group, an alkoxycarbonyl group, an alkylaminocarbonyl group, a dialkylaminocarbonyl group, an alkylcarbonylamino group, a phenylcarbonylamino group, a phenylaminocarbonyl group, or a phenoxycarbonyl group; and X is a hydrogen atom, a halogen atom, an alkoxyl group, an aryloxy group, an alkylthio group, or a phenylthio group, (2) an optical recording medium as described in (1), containing the quinophthalone compound represented by Formula (1) and a photoabsorbing compound having an absorption maximum in a wavelength falling in a range of 550 to 900 nm in the recording layer, (3) an optical recording medium as described in (1) or (2), wherein the reflectance to light selected from lasers having wavelengths of 480 to 600 nm measured from a substrate side is 25% or more, and recording and reproducing are possible with lasers having wavelengths of 480 to 600 nm, (4) an optical recording medium as described in (3), wherein recording and reproducing are possible with a laser selected from those having wavelengths of 600 to 830 nm, (5) an optical recording medium as described in (3), wherein the reflectance to light selected from near infrared lasers having wavelengths of 770 to 830 nm measured from the substrate side is 65% or more, and reproducing is possible with a near infrared laser selected from those having wavelengths of 770 to 830 nm, and (6) an optical recording medium as described in (3), wherein the reflectance to light selected from near infrared lasers having wavelengths of 600 to 700 nm measured from the substrate side is 30% or more, and reproducing is possible with a near infrared laser selected from those having wavelengths of 600 to 700 nm.

According to the present invention, an interchangeable optical recording medium, which can be recorded and reproduced with a laser having a wavelength falling in a range of 480 to 600 nm to which much attention is paid as a wavelength for a high density optical recording medium as well as reproduced, or recorded and reproduced with a laser selected from those having wavelengths of 600 to 830 nm, can be provided by using the quinophthalone compound or the mixture of the quinophthalone compound and a compound having a suitable photoabsorption described above in the recording layer.

BRIEF DESCRIPTION OF THE DRAWING

FIG. 1 is a cross-sectional structural drawing of the optical recording medium, wherein:

Figure 1:
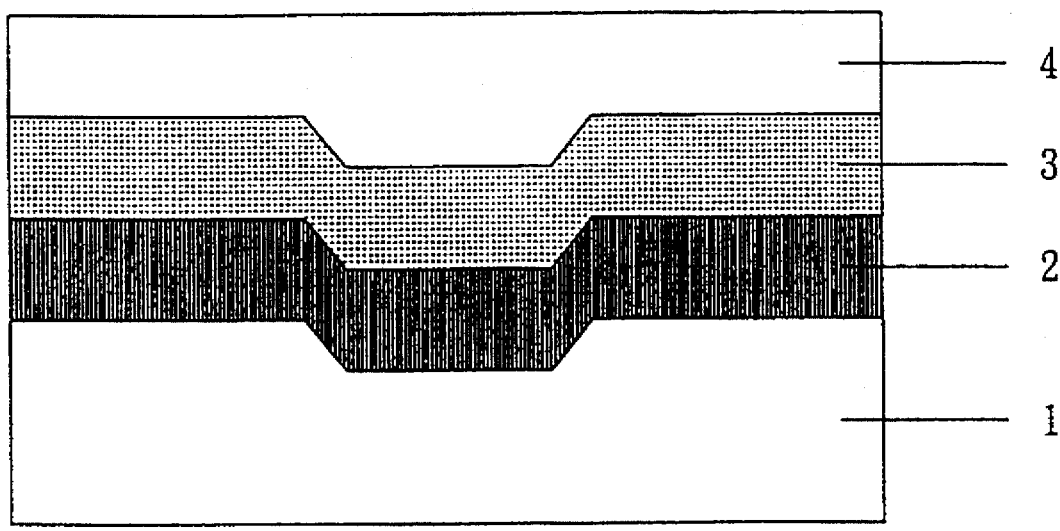

1 substrate, 2 recording layer, 3 reflective layer, and 4 protective layer.

DETAILED DESCRIPTION OF THE PREFERRED EMBODIMENTS

The preferred embodiments the present invention will be explained below.

The optical recording medium of the present invention has a recording layer and a reflective layer on a substrate. The optical recording medium includes both of a read-only optical medium in which information are recorded in advance and an optical recording medium capable of both recording and reproducing information. Here, there will be explained as the suitable example, the latter optical recording medium capable of recording and reproducing information, particularly an optical recording medium comprising a recording layer, a reflective layer and a protective layer formed in this order on a substrate. This optical recording medium has a four layer structure as shown in FIG. 1. That is, a recording layer 2 is formed on a substrate 1, and a reflective layer 3 is provided on the recording layer in close contact therewith. Further, a protective layer 4 is provided to cover the reflective layer 3.

The substrate may be of any material as long as it can transmit recording light and reproducing light. Suitable materials include, for example, high molecular materials such as polycarbonate resins, vinyl chloride resins, acrylic resins such as polymethylmethacrylate, polystyrene resins, and epoxy resins, and inorganic materials such as glass. These substrate materials are molded into discoid substrates by injection molding. Grooves are formed on the surface of a substrate in some cases, if necessary.

The specific examples of $R_1$ to $R_8$ and X in the quinophthalone compound represented by Formula (1) will be described below. The examples of $R_1$ to $R_8$ include a hydrogen atom, halogen atoms such as a fluorine atom, a chlorine atom and a bromine atom, a nitro group, alkyl groups such as methyl, ethyl, n-propyl, i-propyl, n-butyl, i-butyl, t-butyl, n-amyl, i-amyl, n-hexyl, cyclohexyl, n-octyl, 3,5,5-trimethylhexyl and n-dodecyl, alkoxyalkyl groups such as methoxyethyl, ethoxyethyl, i-propoxyethyl, 3-methoxypropyl and 2-methoxybutyl, alkoxyl groups such as methoxyl, ethoxyl, n-propoxyl, i-propoxyl, n-botoxyl, t-butoxyl, n-amyloxy, n-hexyloxy, and n-dodecyloxy, alkoxyalkoxyl groups such as methoxyethoxy, ethoxyethoxy, 3-methoxypropoxy, and 3-(i-propoxy) propoxy, aryloxy groups such as phenoxy, 2-methylphenoxy, 4-methylphenoxy, 4-t-butylphenoxy, 2-methoxyphenoxy and 4-i-propylphenoxy, alkoxycarbonyl groups such as methoxycarbonyl, ethoxycarbonyl, isopropoxycarbonyl and 2,4-dimethylbutoxycarbonyl, alkylaminocarbonyl groups such as methylaminocarbonyl, ethylaminocarbonyl, n-propylaminocarbonyl, n-butylaminocarbonyl and n-hexylaminocarbonyl, dialkylaminocarbonyl groups such as dimethylaminocarbonyl, diethylaminocarbonyl, di-n-propylaminocarbonyl, di-n-butylaminocarbonyl and N-methyl-N-cyclohexylaminocarbonyl, alkylcarbonylamino groups such as acetylamino, ethylcarbonylamino and butylcarbonylamino, phenylaminocarbonyl groups such as phenylaminocarbonyl, 4-methylphenylaminocarbonyl, 2-methoxyphenylaminocarbonyl and 4-n-propylphenylaminocarbonyl, phenylcarbonylamino groups such as phenylcarbonylamino, 4-ethylphenylcarbonylamino and 3-butylphenylcarbonylamino, and phenoxycarbonyl groups such as phenoxycarbonyl, 2-methylphenoxycarbonyl, 4-methoxyphenoxycarbonyl, and 4-t-butylphenoxycarbonyl.

On the other hand, the examples of X include a hydrogen atom, a halogen atom such as a fluorine atom, a chlorine atom and a bromine atom, an alkoxyl group such as methoxyl, ethoxyl, n-propoxyl, i-propoxyl, n-butoxyl, t-butoxyl, n-amyloxy, n-hexyloxy and n-dodecyloxy, an aryloxy group such as phenoxy, 4-methylphenoxy, 4-t-butylphenoxy, 4-ethoxyphenoxy and 4-[2-(4-hydroxyphenyl)propyl]phenoxy, an alkylthio group such as methylthio, ethylthio, propylthio and butylthio, and a phenylthio group such as phenylthio, 4-methylphenylthio, and 2-methoxyphenylthio.

The quinophthalone compound represented by Formula (1) can readily be produced by using a method described in, for example, Japanese Patent Laid-Open No. 6-9891 (1994).

The examples of the photoabsorbing compound having an absorption maximum in a wavelength falling in a range of 550 to 900 nm include pentamethine cyanine dyes, heptamethine cyanine dyes, squalilium dyes, azo dyes, azo metal chelate dyes, naphthoquinone dyes, anthraquinone dyes, indophenol dyes, phthalocyanine dyes and naphthalocyanine dyes. In particular, the compounds which can be mixed with the quinophthalone compound are preferred.

In the case where the recording layer of the present invention is required to be improved in durability, additives such as quenchers, UV absorbers and antioxidants may be blended.

The recording layer containing these dyes is formed on a substrate in a thickness of 50 to 500 nm, preferably 100 to 150 nm by coating methods such as spin coating and casting, sputtering, chemical deposition and vacuum deposition. Particularly in the coating method, coating solutions in which dyes are dissolved or dispersed are used. In this case, solvents which do not damage the substrate are preferably selected. Used singly or in a mixture are, for example, alcohol solvents such as methanol, aliphatic hydrocarbon solvents such as hexane and octane, cyclic hydrocarbon solvents such as cyclohexane, aromatic hydrocarbon solvents such as benzene, halogenated hydrocarbon solvents such as chloroform, ether solvents such as dioxane, cellosolve solvents such as methyl cellosolve, ketone solvents such as acetone, and ester solvents such as ethyl acetate. The recording layer can be composed not only of a single layer but also a multilayer using plural dyes or can be a polymer thin film in which a dye is dispersed preferably in the proportion of about 50% or more. When solvents which do not damage the substrate can not be selected, sputtering, chemical deposition, and vacuum deposition are effective.

Next, the reflective layer having a thickness of 50 to 300 nm, preferably 100 to 150 nm is formed on this recording layer. Substances providing a sufficiently high reflectance in wavelengths of reproducing light, for example, metals such as Au, Al, Ag, Cu, Ti, Cr, Ni, Pt, Ta and Pd can be used as a material for the reflective layer singly or in the form of alloys. Among them, Au and Al have a high reflectance and therefore are suitable for the material for the reflective layer.

In addition to the above substances, there may be included the following ones, for example, metals and semi-metals such as Mg, Se, Hf, V, Nb, Ru, W, Mn, Re, Fe, Co, Rh, Ir, Cu, Zn, Cd, Ga, In, Si, Ge, Te, Pb, Po, Sn and Bi.

A substance containing Au as a main component is suitable since the reflective layer having a high reflectance can readily be obtained. Here, the term "main component" means one having a content of 50% or more. A multilayer film may be formed for the reflective layer with materials other than metals by laminating a thin film having a low reflectance and a thin film having a high reflectance one after the other.

Methods for forming the reflective layer include, for example, sputtering, chemical deposition and vacuum deposition. Further, a reflection magnifying layer and an adhesive layer may be provided between the recording layer and the reflective layer in order to enhance the reflectance and the adhesion.

The optical recording medium of the present invention thus obtained is the medium comprising the recording layer and the reflective layer formed on the substrate, wherein the reflectance to light having a wavelength selected from a range of 480 to 600 nm measured from the substrate side is 25% or more, preferably 30% or more; the reflectance to light having a wavelength selected from a range of 600 to 830 nm measured from the substrate side is 30% or more, preferably 65% or more; and the reflectance according to a red book (CD) standard and an orange book (CD-R) standard is satisfied. If these standards are satisfied, reproduction can be made well even with CD players which have so far been commercially available.

Further, the protective layer may be formed on the reflective layer. Materials for the protective layer are not specifically restricted as long as they can protect the reflective layer from external force. Suitable organic materials include thermoplastic resins, thermosetting resins and UV-curing resins. Among them, the UV-curing resins are preferable. Suitable inorganic materials include $SiO_2$, $SiN_4$, $MgF_2$ and $SnO_2$.

The protective layer can be formed by applying a coating solution prepared by dissolving a thermoplastic resin or a thermosetting resin in a suitable solvent, and drying it. A UV-curing resin is applied as it is or as a solution prepared by dissolving it in a suitable solvent, and it is irradiated with UV rays to cure it, whereby the protective layer can be formed. Acrylate resins such as urethane acrylates, epoxy acrylates and polyester acrylates can be used as the UV-curing resin. These materials may be used singly or in a mixture, and in a single layer film or in a multilayer film.

Coating methods such as spin coating and casting, sputtering, and chemical deposition are used as a method for forming the protective layer. Among them, the spin coating is preferred.

The laser used in the present invention may be any one as long as it has a wavelength falling in a range of 480 to 830 nm. It includes, for example, a dye laser of which the wavelength can be selected from a wide range of a visible region, a YAG higher harmonic conversion laser having a wavelength of 532 nm, and a high power semiconductor laser having a wavelength of 680 nm or 635 nm which has recently been developed. The semiconductor laser is suitable in view of loading onto an apparatus. Further, a near infrared laser may be used as long as it has a wavelength falling in a range of 770 to 830 nm. The semiconductor lasers used in commercially available CD players and CD recorders are also suitable.

EXAMPLES

The examples of the present invention will be shown below but the present invention will by no means be restricted by these examples.

Example 1

A quinophthalone compound of 0.2 g [hereinafter referred to as Dye (A)] represented by the following formula (A) and a pentamethine cyanine dye NK2929 [1,3,3,1',3',3'-hexamethyl-2,2'-(4,5,4',5'-dibenzo)indodicarbocyanine perchlorate] (manufactured by Nippon Kanko Shikiso Kenkyusho K.K.) of 0.02 g (photoabsorbing agent) were dissolved in diacetone alcohol (manufactured by Tokyo Kasei Co., Ltd.) of 10 ml to prepare a dye solution. Used as a substrate was a disk with a diameter of 120 mm and a thickness of 1.2 mm made of polycarbonate and having continuous guide grooves (track pitch: 1.6 μm). The dye solution was spin-coated on this substrate at a revolution of 1500 rpm and dried at 70° C. for 2 hours to form a recording layer. Then, Au was sputtered on this recording layer with a sputtering apparatus (CDI-900 manufactured by Balzers Co., Ltd.) to form a reflective layer having a thickness of 100 nm. Argon gas was used for sputtering gas. The sputtering was carried out on the conditions of a sputtering power of 2.5 kW and a sputtering gas pressure of $1.0 \times 10^{-2}$ Torr. Further, a UV-curing resin SD-17 (manufactured by Dainippon Ink Chemical Ind. Co., Ltd.) was spin-coated on the reflective layer and was then irradiated with UV rays to form a protective layer having a thickness of 6 μm. The sample thus prepared was used for recording at a linear velocity of 5.6 m/s and a laser power of 10 mW with an optical disk evaluation apparatus equipped with a 532 nm YAG higher harmonic conversion laser head, and an EFM encoder. After recording, the signals were reproduced with the same evaluation apparatus to find that fine eye patterns were observed, wherein the reflectance was 31%.

Further, this recorded sample was reproduced with a commercially available CD player having a reproducing wavelength of 780 nm for evaluation. As a result, it was confirmed that the reflectance was 70% and the error rate was 3 cps and that reproduction could be made well and reproduction was possible even with a reproducing apparatus equipped with a near infrared semiconductor laser head.

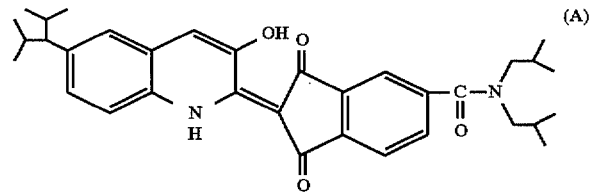
(A)

Example 2

An optical recording medium was produced in the same manner as in Example 1, except that a quinophthalone compound represented by the following formula (B) was substituted for Dye (A) in Example 1, and an azo dye represented by the following formula (C) was used as a photoabsorbing agent. The medium thus prepared was used for recording at a linear velocity of 5.6 m/s and a laser power of 10 mW with the optical disk evaluation apparatus equipped with the 532 nm YAG higher harmonic conversion laser head, and the EFM encoder, as was the case with Example 1. After recording, the signals were reproduced with the same evaluation apparatus to find that the reflectance was 30%.

Further, this recorded sample was reproduced with a CD player having a reproducing wavelength of 680 nm for evaluation. As a result, the reflectance was 32%, and the error rate was 5 cps. Accordingly, reproduction could be made well.

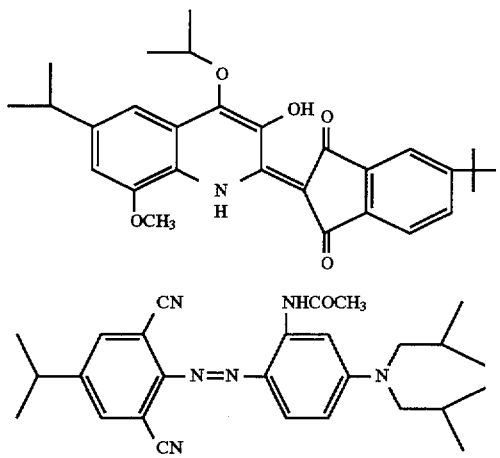

Example 3

An optical recording medium was produced in the same manner as in Example 1, except that a quinophthalone compound represented by the following formula (D) was substituted for Dye (A) in Example 1. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was 28%.

Further, this recorded sample was reproduced with a commercially available CD player having a reproducing wavelength of 780 nm for evaluation. As a result, the reflectance was 69%, and the error rate was 3 cps. Accordingly, reproduction could be made well.

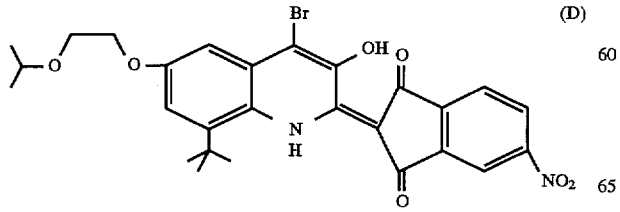

Example 4

An optical recording medium was produced in the same manner as in Example 1, except that a quinophthalone compound represented by the following formula (E) was substituted for Dye (A) in Example 1, and an azo dye represented by the following formula (F) was used as a photoabsorbing agent. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was 30%.

Further, this recorded sample was reproduced with a CD player having a reproducing wavelength of 635 nm for evaluation. As a result, the reflectance was 30%, and the error rate was 7 cps. Accordingly, reproduction could be made well.

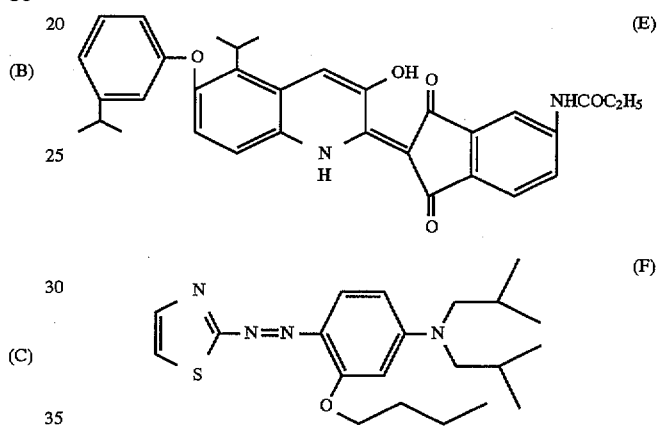

Example 5

An optical recording medium was produced in the same manner as in Example 1, except that a quinophthalone compound represented by the following formula (G) was substituted for Dye (A) in Example 1. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was 29%.

Further, this recorded sample was reproduced with the commercially available CD player having a reproducing wavelength of 780 nm for evaluation. As a result, the reflectance was 71%, and the error rate was 6 cps. Accordingly, reproduction could be made well.

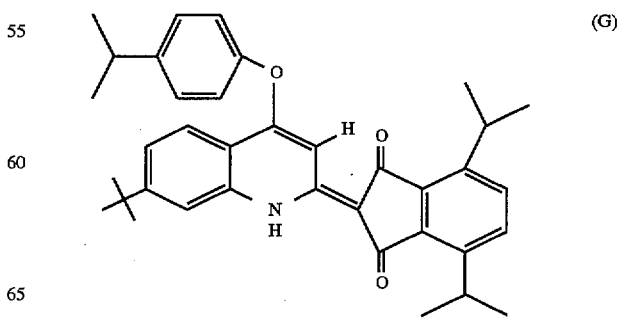

Example 6

An optical recording medium was produced in the same manner as in Example 1, except that a quinophthalone compound represented by the following formula (H) was substituted for Dye (A) in Example 1. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was 30%.

Further, this recorded sample was reproduced with the commercially available CD player having a reproducing wavelength of 780 nm for evaluation. As a result, the reflectance was 72%, and the error rate was 3 cps. Accordingly, reproduction could be made well.

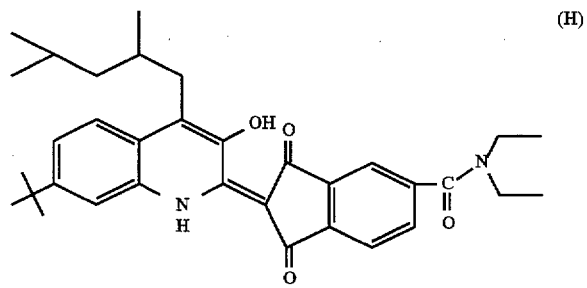

(H)

Example 7

An optical recording medium was produced in the same manner as in Example 1, except that a quinophthalone compound represented by the following formula (I) was substituted for Dye (A) in Example 1. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was 31%.

Further, this recorded sample was reproduced with the commercially available CD player having a reproducing wavelength of 780 nm for evaluation. As a result, the reflectance was 70%, and the error rate was 5 cps. Accordingly, reproduction could be made well.

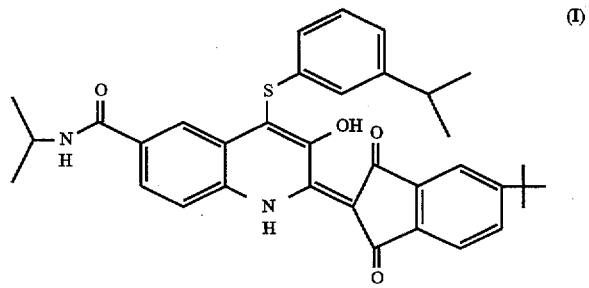

(I)

Example 8

An optical recording medium was produced in the same manner as in Example 2, except that a quinophthalone compound represented by the following formula (J) was substituted for Dye (B) in Example 2. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was 29%.

Further, this recorded sample was reproduced with the CD player having a reproducing wavelength of 680 nm for evaluation. As a result, the reflectance was 33% and the error rate was 5 cps. Accordingly, reproduction could be made well.

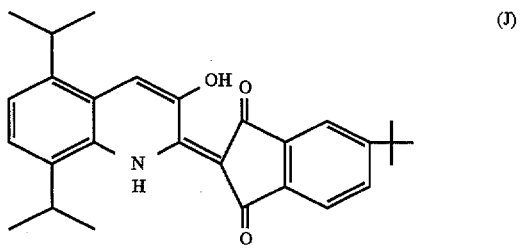

(J)

Example 9

An optical recording medium was produced in the same manner as that in Example 1, except that a quinophthalone compound represented by the following formula (K) was substituted for Dye (A) in Example 1. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was 30%.

Further, this recorded sample was reproduced with the commercially available CD player having a reproducing wavelength of 780 nm for evaluation. As a result, the reflectance was 72%, and the error rate was 4 cps. Accordingly, reproduction could be made well.

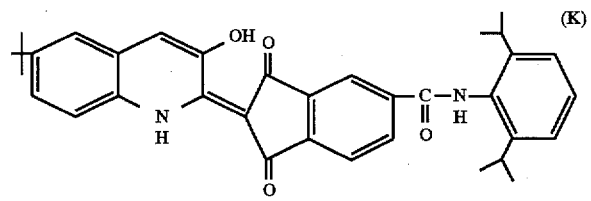

(K)

Example 10

An optical recording medium was produced in the same manner as in Example 1, except that a quinophthalone compound represented by the following formula (L) was substituted for Dye (A) in Example 1. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was 32%.

Further, this recorded sample was reproduced with the commercially available CD player having a reproducing wavelength of 780 nm for evaluation. As a result, the reflectance was 70%, and the error rate was 5 cps. Accordingly, reproduction could be made well.

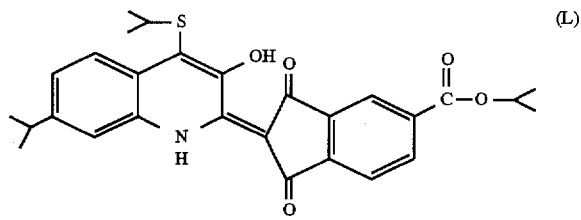

(L)

Example 11

An optical recording medium was produced in the same manner as in Example 1, except that a quinophthalone compound represented by the following formula (M) was substituted for Dye (B) in Example 2. The medium thus prepared was used for recording at a linear velocity of 5.6 m/s and a laser power of 10 mW with the optical disk evaluation apparatus equipped with the 532 nm laser head, and the EFM encoder, as was the case With Example 1. After recording, the signals were reproduced with the same evaluation apparatus to find that the reflectance was 30%.

Further, this recorded sample was reproduced with the CD player having a reproducing wavelength of 680 nm for evaluation. As a result, the reflectance was 35% and the error rate was 3 cps. Accordingly, reproduction could be made well.

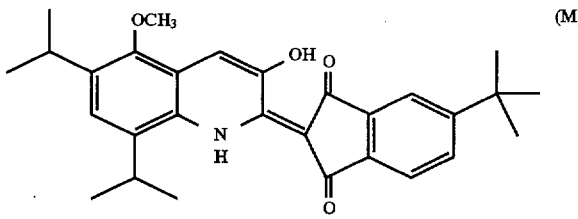

(M)

Example 12

An optical recording medium was produced in the same manner as in Example 1, except that a quinophthalone compound represented by the following formula (N) was substituted for Dye (B) in Example 2. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was 29%.

Further, this recorded sample was reproduced with the commercially available CD player having a reproducing wavelength of 780 nm for evaluation. As a result, the reflectance was 73%, and the error rate was 3 cps. Accordingly, reproduction could be made well.

Example 13

An optical recording medium was produced in the same manner as in Example 1, except that a quinophthalone compound represented by the following formula (O) was substituted for Dye (A) in Example 1. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was 30%.

Further, this recorded sample was reproduced with the commercially available CD player having a reproducing wavelength of 780 nm for evaluation. As a result, the reflectance was 70%, and the error rate was 7 cps. Accordingly, reproduction could be made well.

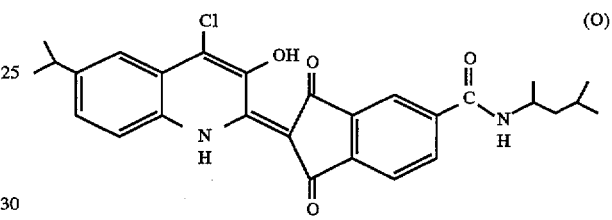

(O)

Example 14

An optical recording medium was produced in the same manner as in Example 1, except that a phthalocyanine compound represented by the following formula (P) was substituted for the photoabsorbing agent NK 2929 in Example 1. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was 29%.

Further, this recorded sample was reproduced with the commercially available CD player having a reproducing wavelength of 780 nm for evaluation. As a result, the reflectance was 73% and the error rate was 5 cps. Accordingly, reproduction could be made well.

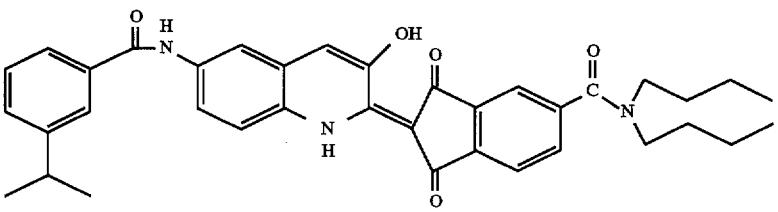

(N)

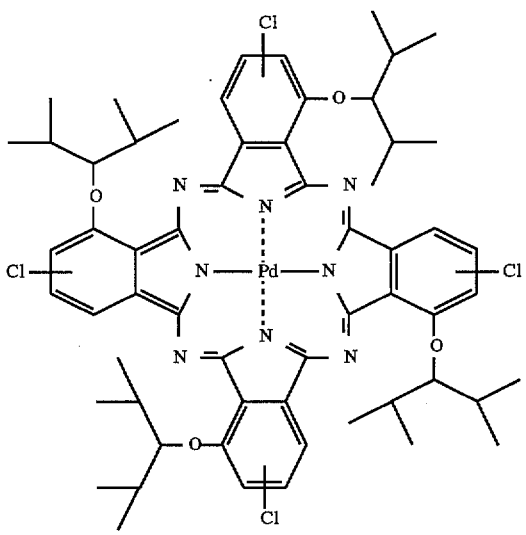

(P)

Example 15

An optical recording medium was produced in the same manner as in Example 1, except that a phthalocyanine compound represented by the following formula (Q) was substituted for the photoabsorbing agent NK 2929 in Example 1. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was 33%.

Further, this recorded sample was reproduced with the commercially available CD player having a reproducing wavelength of 780 nm for evaluation. As a result, the reflectance was 72%, and the error rate was 6 cps. Accordingly, reproduction could be made well.

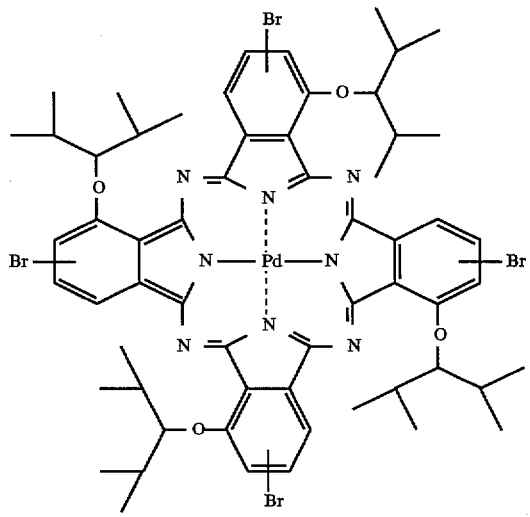

(Q)

Example 16

The optical recording medium obtained in Example 1 was used for recording at a linear velocity of 2 m/s and a laser power of 6 mW with an optical disk evaluation apparatus equipped with a 780 nm semiconductor laser head, and the EFM encoder. After recording, the signals were reproduced with the same evaluation apparatus to find that fine eye patterns were observed, wherein the reflectance was 73%.

Further, this recorded sample was reproduced with the optical disk evaluation apparatus equipped with the 532 nm YAG higher harmonic conversion laser head, and the EFM encoder for evaluation. As a result, the reflectance was 30%, and the error rate was 3 cps. Accordingly, reproduction could be made well.

Example 17

The optical recording medium obtained in Example 4 was used for recording at a linear velocity of 5.6 m/s and a laser power of 10 mW with an optical disk evaluation apparatus equipped with a 635 nm semiconductor laser head, and the EFM encoder. After recording, the signals were reproduced with the same evaluation apparatus to find that fine eye patterns were observed, wherein the reflectance was 31%.

Further, this recorded sample was reproduced with the optical disk evaluation apparatus equipped with the 532 nm YAG higher harmonic conversion laser head, and the EFM encoder for evaluation. As a result, the reflectance was 30%, and the error rate was 8 cps. Accordingly, reproduction could be made well.

Example 18

An optical recording medium was produced in the same manner as in Example 1, except that a dye solution was prepared without adding the pentamethine cyanine dye NK 2929 which was a photoabsorbing agent. The medium thus prepared was used for recording at a linear velocity of 5.6 m/s and a laser power of 10 mW with the optical disk evaluation apparatus equipped with a 532 nm laser head, and the EFM encoder, as was the case with Example 1. After recording, the signals were reproduced with the same evaluation apparatus to find that fine eye patterns were observed, wherein the reflectance was 56%.

Comparative Example 1

An optical recording medium was produced in the same manner as in Example 1, except that the quinophthalone dye (A) was not added. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was as low as about 6% and the wave form was distorted. Moreover, reproduction over a long period of time deteriorated the signals.

Further, this recorded medium was evaluated with the commercially available CD player having a reproducing wavelength of 780 nm to find that the error rate was 2980 cps, and therefore the reproduction was inferior.

Comparative Example 2

An optical recording medium was produced in the same manner as in Example 1, except that the quinophthalone dye (A) was not added, and a pentamethine cyanine dye NK2627 (3,3'-diethyl-2,2'-(6,7,6',7'-dibenzo)thiadicarbocyanine iodide) (manufactured by Nippon Kanko Shikiso Kenkyusho K.K.) was used for the photoabsorbing agent. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was as low as 9% and the wave form was distorted. Moreover, reproduction over a long period of time deteriorated the signals.

Further, this recorded medium was evaluated with the commercially available CD player having a reproducing wavelength of 780 nm to find that the error rate was 3320 cps, and therefore the reproduction was inferior.

Comparative Example 3

An optical recording medium was produced in the same manner as in Example 1, except that the quinophthalone dye (A) was not added, and a pentamethine cyanine dye NK1456 (1,1'-diethyl-2,2'-quinodicarbocyanine iodide) (manufactured by Nippon Kanko Shikiso Kenkyusho K.K.) was used for the photoabsorbing agent. The medium thus prepared was used for recording at a linear velocity of 5.6 m/s and a laser power of 10 mW with the optical disk evaluation apparatus equipped with the 532 nm laser head, and the EFM encoder, as was the case with Example 1. After recording, the signals were reproduced with the same evaluation apparatus to find that the reflectance was as low as about 8% and the wave form was distorted. Moreover, reproduction over a long period of time deteriorated the signals.

Further, this recorded medium was evaluated with the commercially available CD player having a reproducing wavelength of 780 nm to find that the error rate was 3570 cps, and therefore the reproduction was inferior.

What is claimed is:

1. An optical recording medium comprising a recording layer, a reflective layer and a protective layer provided on a substrate, wherein the recording layer contains a quinophthalone compound represented by the following Formula (1) and having an absorption maximum in a wavelength falling in a range of 400 to 500 nm:

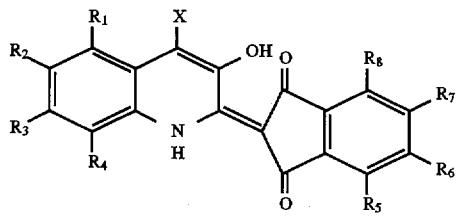

(1)

wherein $R_1$ to $R_8$ are independently a hydrogen atom, a halogen atom, a vitro group, an alkyl group, an alkoxyalkyl group, an alkoxyl group, an alkoxyalkoxyl group, an aryloxy group, an alkoxycarbonyl group, an alkylaminocarbonyl group, a dialkylaminocarbonyl group, an alkylcarbonylamino group, a phenylcarbonylamino group, a phenylaminocarbonyl group, or a phenoxycarbonyl group; and X is a hydrogen atom, a halogen atom, an alkoxyl group, an aryloxy group, an alkylthio group, or a phenylthio group, and wherein the reflectance to light from lasers having a wavelength of 480 to 600 nm measured from the substrate side is 25% or greater.

2. An optical recording medium as described in claim 1, containing the quinophthalone compound represented by Formula (1) and a photoabsorbing compound having an absorption maximum in a wavelength falling in a range of 550 to 900 nm in the recording layer.

3. An optical recording medium as described in claim 2, wherein recording and reproducing are possible with a laser selected from those having wavelengths of 600 to 830 nm.

4. An optical recording medium as described in claim 2, wherein the reflectance to light selected from near infrared lasers having wavelengths of 770 to 830 nm measured from the substrate side is 65% or more, and reproducing is possible with a near infrared laser selected from those having wavelengths of 770 to 830 nm.

5. An optical recording medium as described in claim 2, wherein the reflectance to light selected from near infrared lasers having wavelengths of 600 to 700 nm measured from the substrate side is 30% or more, and reproducing is possible with a near infrared laser selected from those having wavelengths of 600 to 700 nm.

6. An optical recording medium as described in claim 1, wherein recording and reproducing are possible with a laser selected from those having wavelengths of 600 to 830 nm.

7. An optical recording medium as described in claim 1, wherein the reflectance to light selected from near infrared lasers having wavelengths of 770 to 830 nm measured from the substrate side is 65% or more, and reproducing is possible with a near infrared laser selected from those having wavelengths of 770 to 830 nm.

8. An optical recording medium as described in claim 1, wherein the reflectance to light selected from near infrared lasers having wavelengths of 600 to 700 nm measured from the substrate side is 30% or more, and reproducing is possible with a near infrared laser selected from those having wavelengths of 600 to 700 nm.

* * * * *